United States Patent Office 3,464,914
Patented Sept. 2, 1969

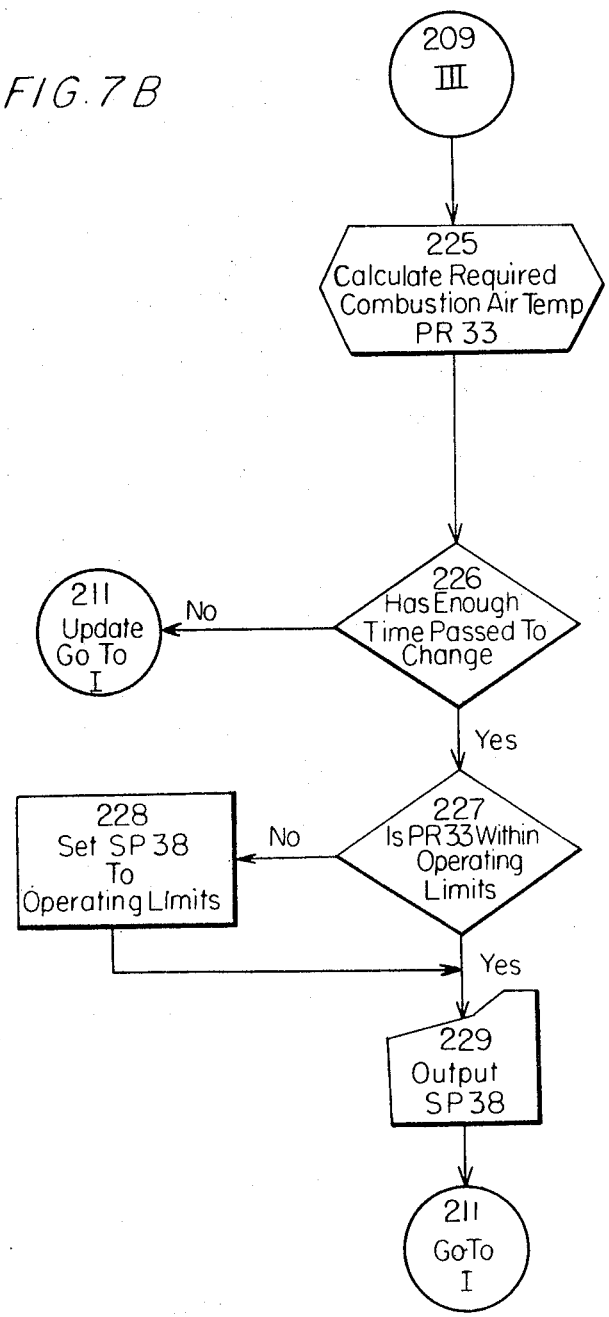

3,464,914
REGULATION OF CATALYST SEAL LEG TEMPERATURE
Vern W. Weekman, Jr., Cherry Hill, N.J., assignor to Mobil Oil Corporation, a corporation of New York
Filed July 27, 1967, Ser. No. 656,549
Int. Cl. C10g *13/14*
U.S. Cl. 208—174                                    9 Claims

ABSTRACT OF THE DISCLOSURE

The computer regulation of the temperature of the catalyst in a catalytic hydrocarbon cracking reactor is carried out by manipulation of kiln cooling air rate, the temperature of kiln combustion air and the temperature of the catalyst lift air. This control method and apparatus maintain a desired seal leg temperature of the catalyst entering the reactor and reduce disturbances which arise from variations in hydrocarbon feed quality and ambient conditions. The control scheme employs a feedforward and feedback control system in which the catalyst lift air and combustion air temperature are responsive to the kiln temperature at a point above the cooling coils. In addition the entire control system responds to the actual temperature of the catalyst in the seal leg, in an adaptive and a feedback loop.

BACKGROUND AND SUMMARY

The capability to operate a catalytic cracking unit at or near its optimum depends on the regulation of key variables which affect reactor performance. Any successful optimization strategy must have the ability to handle a specific feed at a set of predetermined conditions. One of these key variables is the temperature of the catalyst entering the reactor. Fluctuations in the charge stock will increase or decrease unit coke make. Coke disturbances are transformed in the kiln to catalyst temperature changes which are then passed on to the reactor. Thus, a control scheme which closely controls catalyst temperature changes permits closer regulation of desired conditions.

The objective of the control program is to maintain predetermined reactor seal leg temperatures by regulating lift air temperature, combustion air temperature and cooling air rate. The controllers on these variables are manipulated by the computer through set point stations. The computer scans the kiln operation once each minute, performs calculations and changes the set points of these key variables to maintain the desired reactor seal leg temperature.

The control program calculates the required set points this way: First, the computer looks at the average temperature above the cooling coils and determines the proper lift air temperature required to maintain a desired seal leg temperature. This lift air temperature is not asked for until the catalyst has time to travel from the cooling coils to the lift pot (delay). Second, if the lift air temperature is above or below a predetermined limit (such as $>800°$ F. or $<400°$ F.) the combustion air temperature is lowered or raised (for example, in 40° F. increments) periodically (such as every 10 minutes) until the lift air temperature is brought back into range. If the lift air temperature required is less than a lower predetermined limit (i.e. $<200°$ F.), the cooling air flow is also used to bring the lift back into range. After the control program has been working on a given seal leg set point for a period of time (i.e. 10 minutes), an adaptive loop (fine adjustments) starts work to eliminate any remaining error between the desired seal leg temperature and the actual seal leg temperature. When an optimization program calls for frequent changes in the set point of the seal leg temperature, closer control is obtained by a direct feedback loop to bias the lift air temperature an amount proportional to the error between the desired and actual seal leg temperature.

THE INVENTION

The invention will be described in conjunction with the following figures.

FIGURE 1 presents a system useful in carrying out the present invention.

Figure 4:
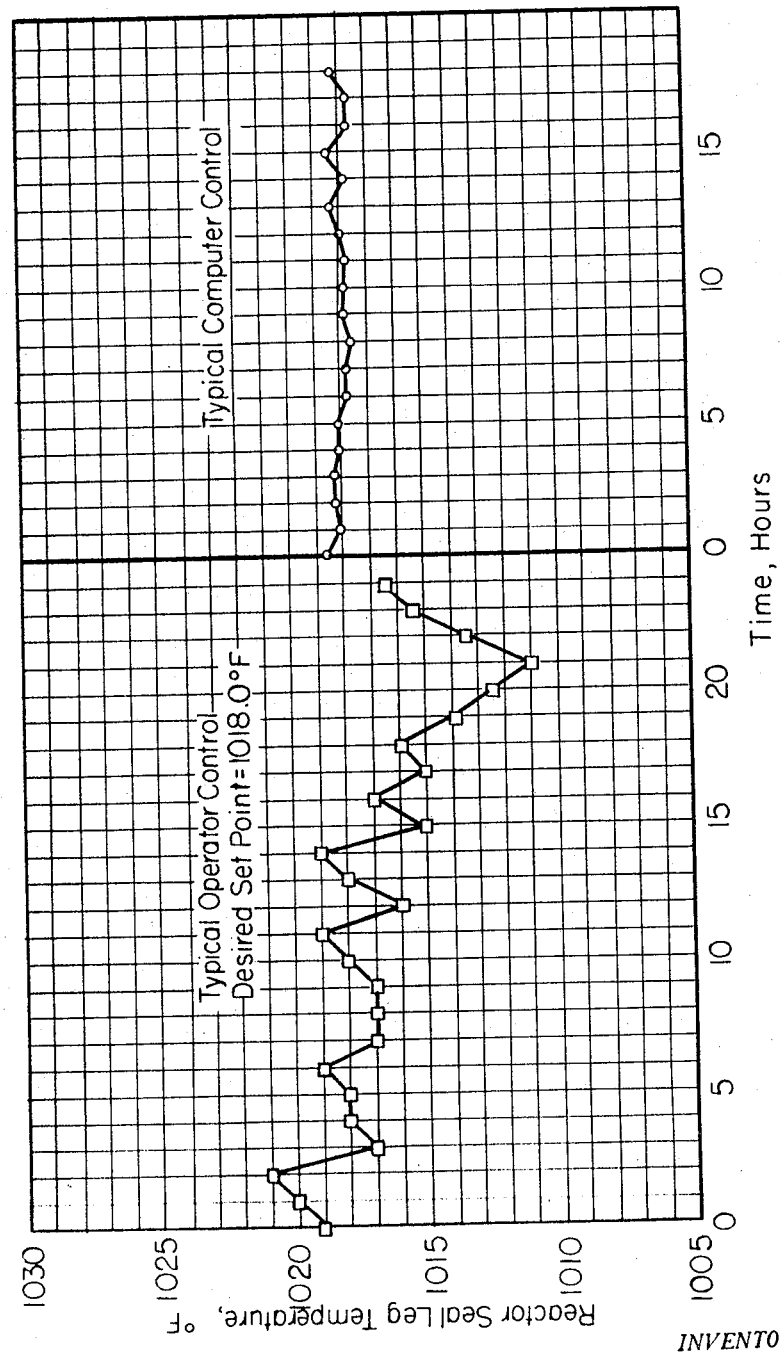
Figure 5:
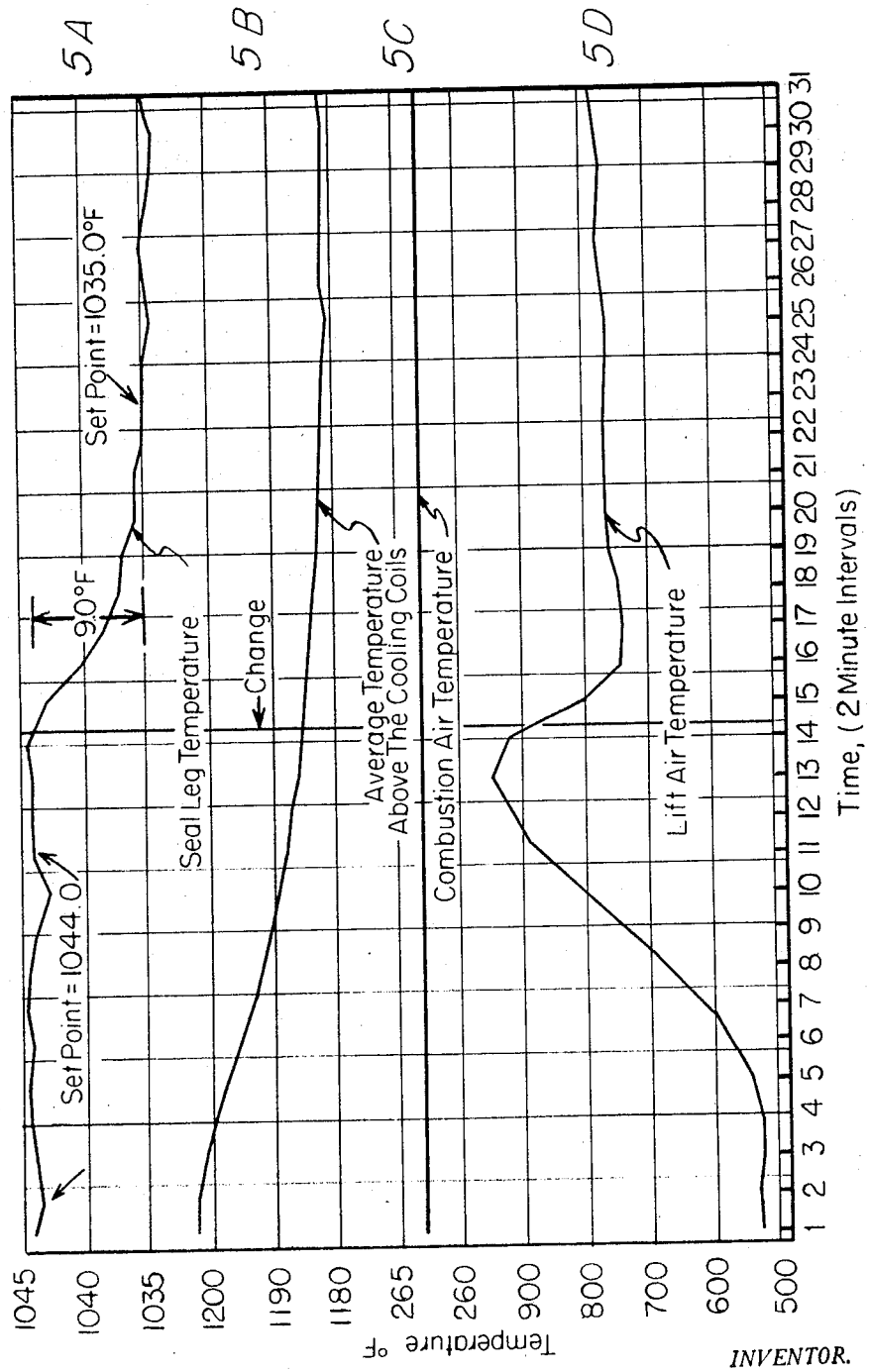
Figure 6:
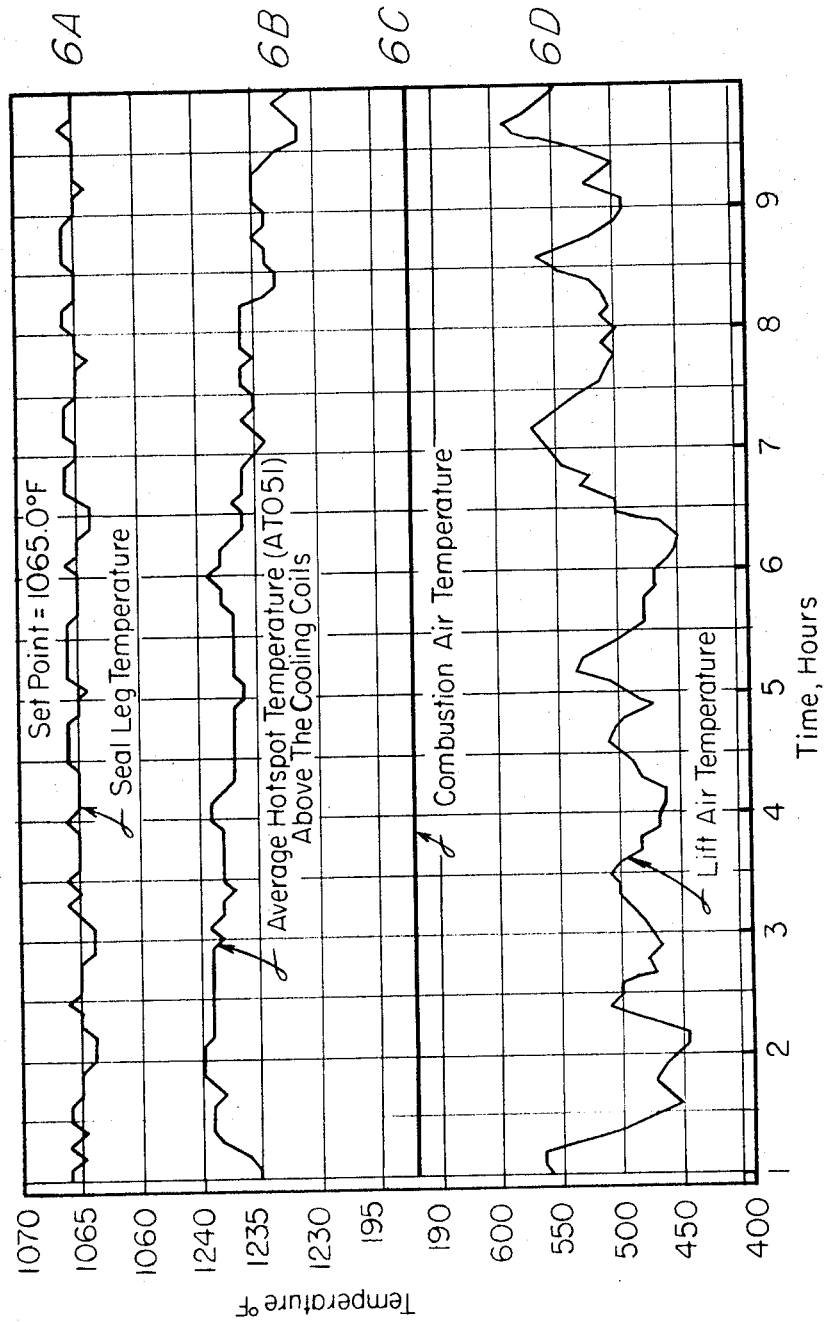

FIGURES 4–6 present data for example of seal leg temperature control.

Figure 7A:
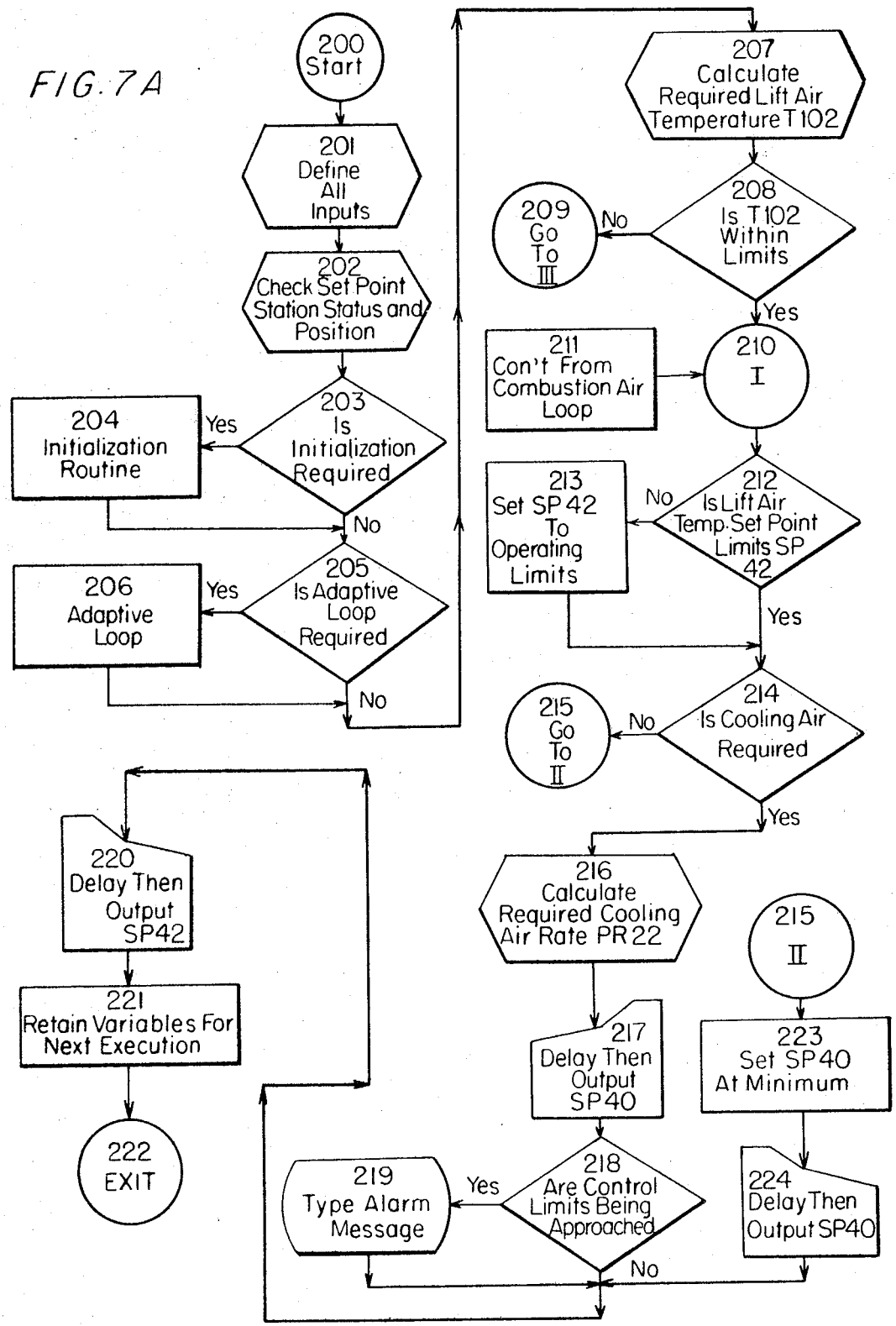

FIGURES 7A and 7B show a simplified flow diagram of a control program.

Figure 1:
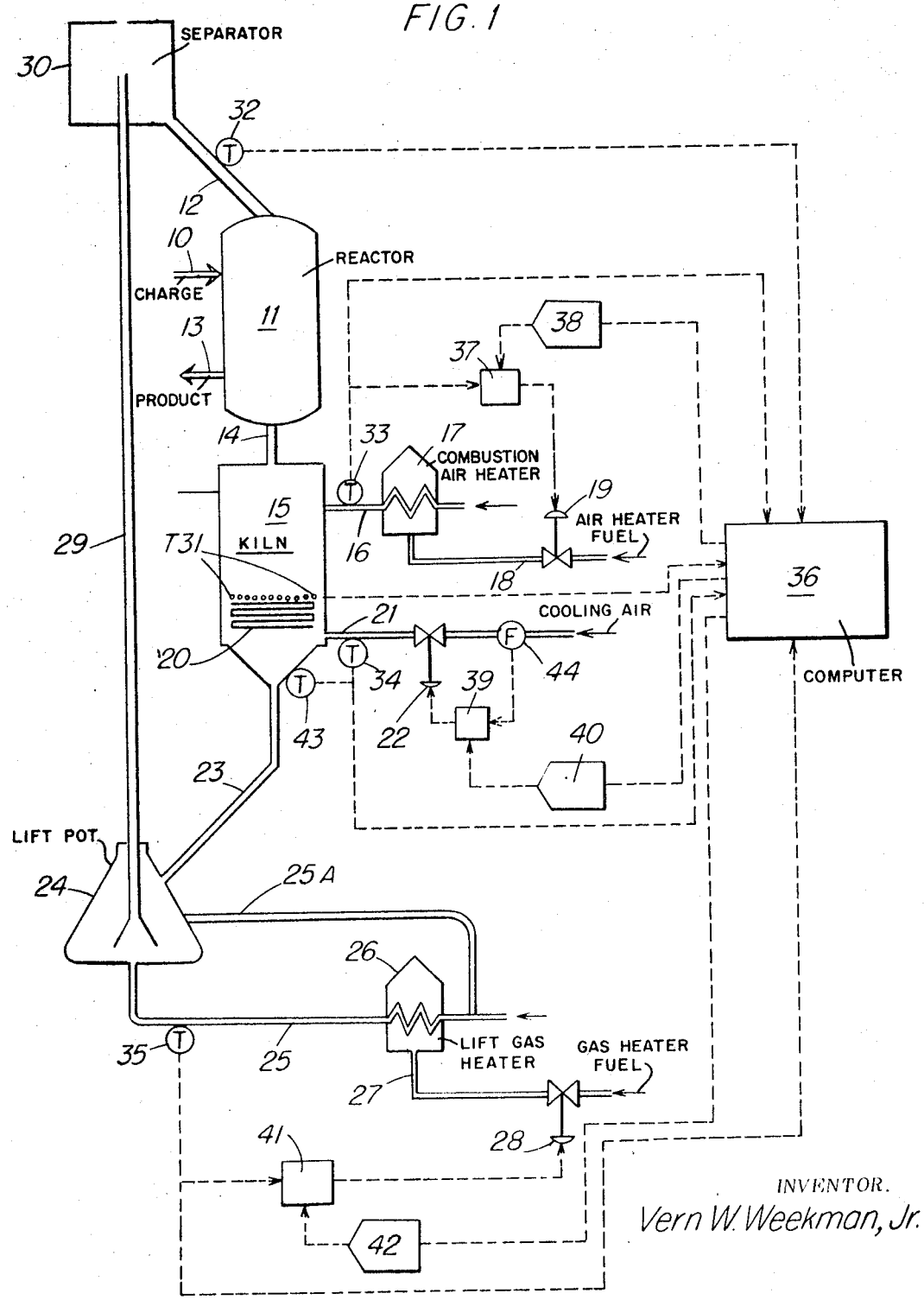

FIGURE 1 depicts an embodiment of the present invention for the control of a moving bed catalytic cracker (TCC). A hydrocarbon charge stock is fed through a conduit 10 to a catalytic cracking reactor 11, which internally contains those features (not shown) well known in the art for inducing uniform flow and proper contact with the catalyst stream which enters via conduit 12, hereinafter referred to as the seal leg. The catalyst moves downwardly through the reactor in contact with the hydrocarbon charge under conversion conditions of elevated temperatures, at which the heavier hydrocarbons are cracked to yield a major proportion of light hydrocarbon materials. The hydrocarbon product stream is withdrawn from the reactor through conduit 13 after which it is further processed and refined. During the cracking process a minor proportion of carbonaceous material, or coke, is formed and deposited upon the particles of catalyst. The contaminated catalyst material is withdrawn from the reactor and fed by a conduit 14 to a kiln 15. In the kiln the catalyst is brought into contact with a combustion supporting gas, such as air, which burns the coke from the surface of the catalyst and renders it suitable for reuse. The combustion air is directed into the middle to upper portion of the kiln through conduit 16. The combustion air is preheated in a furnace or line burner 17 by means of a fuel gas directed to the heater through conduit 18. The rate of flow of fuel gas is controlled by means of valve 19. In the lower portion of the kiln a series of cooling coils 20 are situated. These cooling coils may contain steam directed through them. Cooling air is introduced into kiln 15 through conduit 21. The flow rate of the cooling air is controlled by means of valve 22. From the lower portion of the kiln the regenerated catalyst is directed by a conduit 23 to a lift pot 24. The lift pot receives a primary stream of gas, such as air, through conduit 25 and a secondary stream through conduit 25A. The primary lift air is preheated in furnace or burner 26 by means of a fuel gas directed to the burner through conduit 27. The flow rate of this fuel gas is controlled by means of valve 28. The catalyst in the lift pot is blown up by the lift air through conduit 29 into a surge separator 30, from which the catalyst is once again directed to the reactor through conduit 12.

In order to carry out the control scheme of this invention several parameters of the above cracking process must be sensed and controlled. The control program manipulates cooling air rate, lift air temperature and combustion air temperature to maintain a desired reactor seal leg temperature. The primary sensors of the control scheme are the several thermocouples T31 situated in the reactor above the cooling coils. Other sensing points include thermocouple T32 in the reactor seal leg 12, T33 in the combustion air inlet 16, T34 in the cooling air inlet 21 and T35 in the primary lift air inlet 25. Since the combustion, cooling, and lift air may be provided from a common source or blower (not shown), T34 generates a signal representative of the air temperature prior to passage through heaters 17 and 26, and the temperature of the secondary lift air in 25A. Each of these thermocouples transmits signals to computer 36 which may be a digital computer such as IBM model 1800. In addition, T33 transmits its signal to analog controller 37, which is preferably a conventional temperature recorder controller (TRC), which compares the sensed temperature from T33 to a set point, and correspondingly transmits a control signal to adjust valve 19. The set point of controller 37 is adjusted by set point station 38, which is of conventional manufacture, such as model 67, Foxboro Co., in accordance with signals received from computer 36. A flow indicator F44 transmits a signal to analog controller 39 which is preferably a conventional flow recorder controller (FRC) which compares the sensed flow to a set point and in turn transmits a control signal to valve 22. The set point of controller 39 is adjusted by set point station 40 which receives signals from computer 36. T35 transmits a signal to analog controller 41 (TRC), in which the signal is compared with a set point value and from which a control signal is generated to valve 28. The controller 41 is adjusted by means of set point station 42 which receives signals from the computer 36. Thermocouple 43 senses the temperature of the catalyst leaving kiln 15 and provides a signal to computer 36.

Alternatively, the setting of valves 19, 22 and 28 can be controlled by direct digital control (DDC). When employing DDC, the analog loops are supplanted with the digital equivalent and adjusting the computer program to compensate for the change. When employing DDC, valves 19, 22 and 28 are electronically driven directly by electrical impulses from the computer. Such valves are well known in the art and need not be described in detail herein. Thus when employing DDC, set point stations 38, 40 and 42 as well as controllers 37, 39 and 41 are not employed.

Additional means may be provided (not shown) to sense other variables of interest in the present invention. For example, pressure transducer means may be situated in conduits 29, 25 or 25A or in lift pot 24, to provide information to the computer on air and catalyst flow rates. Additional thermocouples may be situated in line 23, kiln flue gas exits (not shown), reactor 11, and prior to burners 17 and 26. The detailed information concerning further instrumentation, data gathering, and computer interfacing are well known to those skilled in the art.

The objective of the kiln control strategy on the reactor unit is to maintain the reactor seal leg temperature at a desired value. To accomplish this, heat must be added or removed from the circulating catalyst to counteract the effect of varying heat release in the kiln. These kiln disturbances result from feed stock changes or variations in the reactor operating conditions. Heat may be added to the kiln system by heating the lift air or combustion air; and can be removed by control of the cooling air rate to the kiln. The preferred control strategy provides for the manipulation of lift air temperature, cooling air rate and combustion air temperature. The control strategy is as follows (FIGURE 1): The primary control loop is the manipulation of lift air temperature in a feedforward sense based on variations in the measured "hot spot" temperatures (T31) above the cooling coils. The control range of the lift air temperature is limited; for a TCC air lift system a full range variation of 800° F. in lift air will affect seal leg temperature only 27° F. at 650 t./h. (tons/hour) catalyst circulation. From time to time the lift air temperature control will become "saturated"—that is, temperature beyond the range of the lift air heater will be required to regulate the seal leg temperature. In these instances, heat is either added by raising the combustion air temperature or removed by lowering the combustion air temperature and adding cooling air to bring the lift air temperature back within control range. Since the combustion air inlets are located above the primary sensor (temperatures above cooling coils) any control action taken on the combustion air temperature is feedback. Because of transportation lag and a relatively high time constant for the primary sensor, it may take about 18–22 minutes for any change in combustion air temperature to be detected above the cooling coils. Therefore, combustion air temperature is used only as a secondary loop to keep the lift heater within control limits.

Changes in the position of the hot spot temperatures in the kiln and instrument errors may cause the feedforward control scheme to drift. To provide correction for these occurrences an adaptive loop is used in the control program. This loop corrects the temperature above the cooling coils through control action based on the error between the desired seal leg temperature and the actual seal leg temperature. For example, if a shift in "hot spots" has occurred in the kiln due to a change in liquid feed distribution causing an error between the actual and desired seal leg temperature, the adaptive loop uses this error to adjust the feedforward lift air temperature output to converge on the desired set point. Under preset refinery operations, drastic changes in feed stock may require a change in the number of cooling coils in service. The control program is sufficiently flexible so that for any given coil operation the program may be easily changed through the manual inputs.

This invention is also applicable to the control of a fluid bed catalytic cracker (FCC). In an FCC unit, control of the temperature of the catalyst entering the reactor may be effected by manipulation of the temperature of the air streams entering the kiln.

Figure 2:
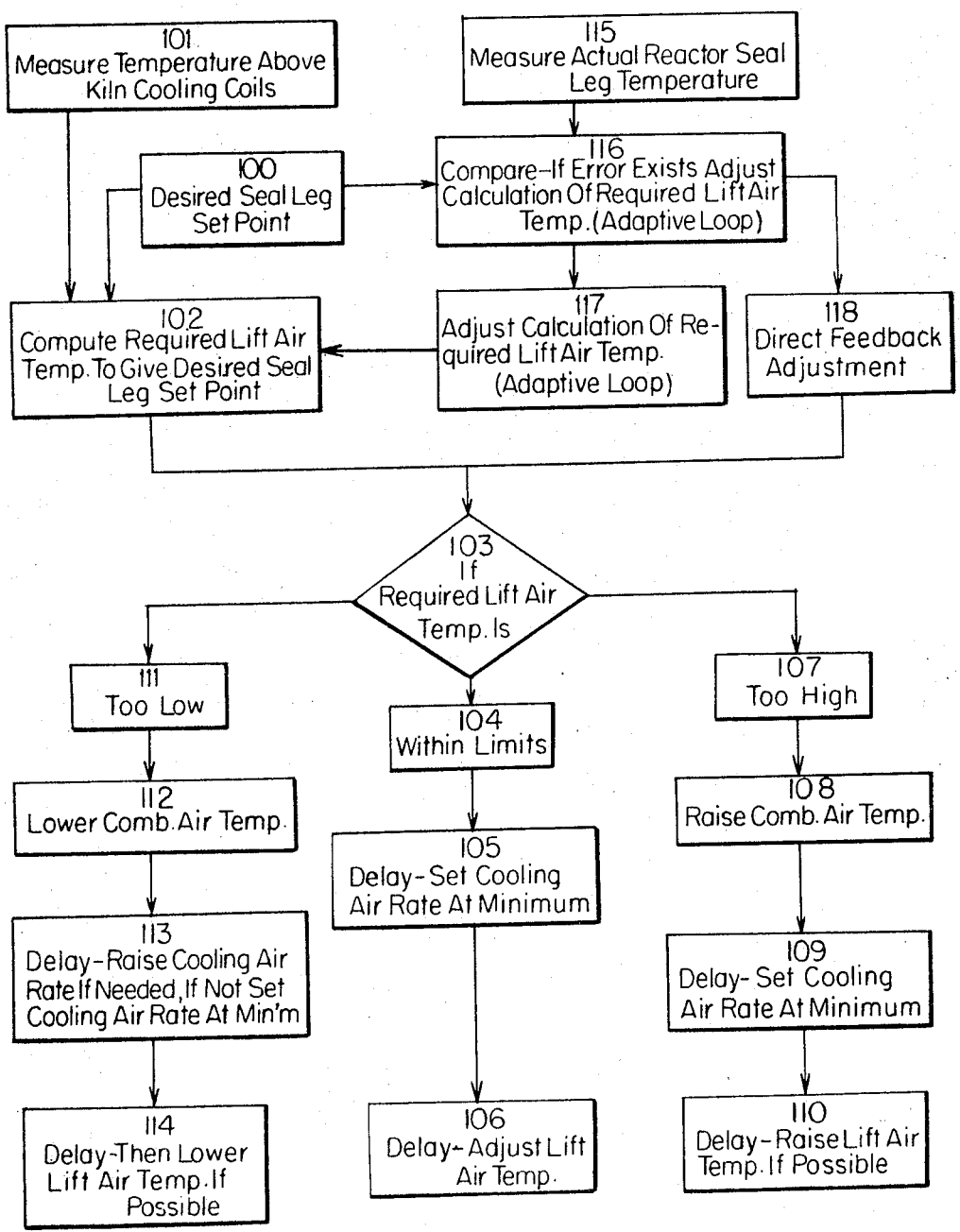
FIGURE 2 is a simplified flow diagram of the control procedure.

A simplified flow diagram to illustrate this control strategy is shown in FIGURE 2.

The desired seal leg temperature is placed in the computer program and establishes a set point criterion for control 100. The temperature above the kiln cooling coils is measured 101 by means of thermocouples T31. This value is an input to the computer wherein the required lift air temperature is calculated 102 to find a value for the lift air temperature which will give the desired seal leg temperature set point. If the required lift air temperature 103 is within pre-established limits 104, after a delay period the cooling air rate is set at a minimum value 105 by adjustment of set point station 40. The lift air temperature is then adjusted 106 through set point station 42, analog control 41 and valve 28. If the required lift air temperature is too high 107 the combustion air temperature is raised 108 by means of set point station 38, analog controller 37 and valve 19. After a delay the cooling air rate is set at its minimum value 109 by the mechanism referred to previously. The lift air temperature is then raised 110 unless it has previously reached its limit. If the required lift air temperature is too low 111 the combustion air temperature is lowered 112 and after a delay the cooling air rate is raised 113 unless the system has already been brought within the limit of the other control loops. The lift air temperature is also lowered 114 if it has not previously been brought to its lower limit. The actual reactor seal leg temperature is measured 115 by means of thermocouple T32. A determination is made 116 whether the actual seal leg temperature corresponds with the desired set point 100. If an error exists an adjustment is made for the required lift air temperature by means of an adaptive loop 117. The equations used to compute the required lift air temperature to give a desired seal leg set point 102 and the nature of the adaptive loop 117 are referred to in greater detail below.

An alternative embodiment of this invention includes a direct feedback control loop 118 which operates on an error signal 116 between the desired seal leg set point 100 and the actual reactor seal leg temperature 115. This feedback control loop 118 generates a correction signal to bias the required lift air temperature signal 102, as directed to 103. The control scheme previously defined for computing a required lift air temperature in combination with an adaptive loop is particularly suited to maintenance of a relatively constant seal leg temperature set point, referred to as the regulation loop. However, in an optimization strategy which requires holding the cracking unit at such constraints as maximum vapor outlet temperature or maximum wet gas rate, it is necessary to make rapid set point changes in the seal leg control program. With the implementation of constraint optimization strategy it becomes necessary to drive the seal leg set point essentially as in a cascade control scheme (i.e. servo loop). To improve the performance of the control scheme for this dual function of servo and regulation control, an embodiment was developed to add direct feedback control 118 in addition to the main feedforward control. This servo function is to bias the required lift air temperature an amount proportional to the error between the desired and actual seal leg temperatures. With the addition of this direct feedback control loop, the set point response of the seal leg temperature to frequent step changes in set point is greatly improved. By properly tuning this controller, referred to in greater detail below, it is possible to speed up the transient response to set point changes and practically eliminate overshoot even though the seal leg temperature does not come to steady state before a new set point value is required.

Figure 3:
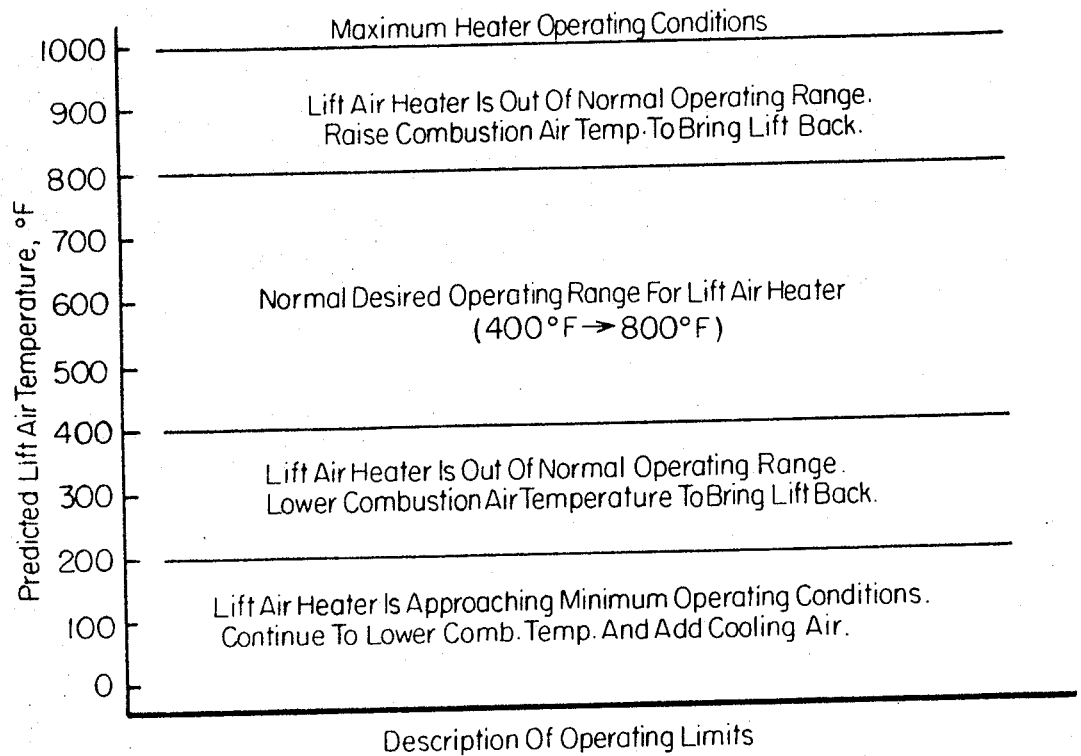
FIGURE 3 is an example of the control procedure of FIGURE 2.

An example of the manner in which the system operates for a conventional TCC air lift system is illustrated in FIGURE 3. The normal operating range for a lift air heater is 400–800° F. When the predicted or required lift air temperature necessary to maintain the seal leg temperature at its set point is within the 400–800° F. range only the lift air temperature control loop is operative, this control loop comprises T35, valve 28 and analog controller 41, as supervised by set point station 42 and computer 36. When the predicted lift air temperature falls in the range of 200–400° F. the combustion air temperature is lowered to reduce the temperature of the catalyst and therefore to ease the burden on the lift air temperature system so that it may operate in its normal range of 400–800° F. The combustion air temperature control loop comprises T33, valve 19 and analog controller 37 as supervised by set point station 38 and computer 36. If the predicted lift air temperature falls below 200° F. the combustion air temperature is further lowered and the cooling air rate is increased. The cooling air control loop comprises F44, valve 22 and analog controller 39, as supervised by set point station 40 and computer 36. The raising of the cooling air rate tends to lower the temperature of the catalyst and to reduce the load on the lift air heater control system to bring it back within its normal operating range. When the predicted lift air temperature rises above 800° F. the combustion air temperature is raised thereby increasing the temperature of the catalyst and permitting the lift air heater system to operate within its normal range.

EXAMPLES

Regulation of seal leg temperature on a TCC by standard operating procedures with any degree of consistency is very difficult. An operator can spend only a portion of his time watching variables which affect seal leg temperature because he must direct his attention to the entire unit. Thus, operator response to changes in the kiln must be slow and all his control action will be on a feedback basis. FIGURE 4 compares a conventional open loop operator regulation to close loop computer regulation in accordance with the present invention.

The data for FIGURE 4A were obtained by monitoring the reactor seal leg temperature on a TCC unit where the operator was instructed to maintain this temperature at 1018° F. in accordance with his normal operating procedures. This type of control is based upon a simple feedback scheme, where the operator observes upsets in the system and then adjusts the parameters under his control to reduce further variations. Note that with conventional operator control the seal leg temperature fluctuates widely in the example shown, between 1011–1021° F. In Example 4B the same TCC unit was controlled in accordance with the present invention, as illustrated in FIGURE 1, and the set point of 1018° F. was maintained within ±½° F. Over an extended period of time, data for closed loop control shows that the seal leg temperature may be operated within ±1° F. as compared with ±7° F. using conventional control. The control program has handled up to 20° F. step changes satisfactorily and has significantly reduced the transient time in going from one steady state to another.

FIGURE 5 represents a typical response of the closed loop to a step change in the desired seal leg temperature. A step change of 9.0° F. was made to the set point for the desired seal leg temperature (FIGURE 2, 100), which resulted in a new steady state being achieved in 10 minutes even though other disturbances were being generated by the kiln at the same time. The changes in the seal leg temperature are illustrated in 5A, where the fluctuations from the first steady state temperature of 1044° F. to the second steady state temperature of 1035° F. is effected by a change in the set point at 28⅔ minutes. The seal leg temperature is brought and maintained within ±1° F. of 1035° F. at 39⅓ minutes. The kiln was undergoing a disturbance prior to and during the change in the set point of the seal leg temperature, as illustrated by the variation in the average temperature above the coils, FIGURE 5B. The temperature above the coils changed from 1202° F. to 1185° F. prior to the change in the seal leg set point. During this period the lift air temperature was rising, FIGURE 5D, in order to prevent the seal leg temperature from dropping with the fall in temperature of the catalyst in the kiln. As illustrated by FIGURE 5C the combustion air temperature remained at 263° F. throughout this example. The combustion air temperature was not changed in this case because the lift air temperature did not exceed the trigger limit for the required time.

FIGURE 6 represents normal response of the closed loop to unit variations. The control program manipulated lift air temperature so that the desired seal leg temperature of 1065° F. was maintained. The seal leg temperature varied between 1064 to 1066° F., FIGURE 6A, while the temperature above the cooling coils fluctuated between 1231–1240° F., FIGURE 6B. This close control of the seal leg temperature was achieved by manipulation of the lift air temperature from 443–593° F., FIGURE 6D. As in the previous example the combustion air temperature control was not activated, FIGURE 6C.

Good seal leg regulation permits the unit to operate close to its constraints. Also, the control program provides the ability to change quickly and efficiently with minimum unit disturbance. This feature plays a very important role in optimization implementation.

Equations for control strategy

The objective of the kiln control strategy is to maintain a predetermined reactor seal leg temperature. The seal leg temperature is maintained by regulating combustion air temperature, lift air temperature and cooling air flow. Using the average of eight "hot spots' above the cooling coils as the primary sensor, the average temperature above the cooling coils is calculated by Equation 1.

(1) $$AT31 = T31 - [\Delta T31 \times F116]$$

where:

$AT31$ = calculated average temperature above cooling coils, ° F.

$T31$ = average value of "hot spots" thermocouples

ΔT31 = the difference between T31 and AT31, °F. (calculated only on program initiation)
F116 = a factor being generated by the adaptive loop to constantly update ΔT31.

The control program is constantly being monitored and corrected through Equation 1 by means of an adaptive loop (F116). F116 (Initially=1.0) is varied through a digital controller to adjust the heat balance as the error between the actual seal leg temperature (T32) and the desired seal leg temperature (T100) increases and decreases. Equation 2 is the general form of the digital controller used throughout the program.

(2)
$$Z = ZS + (A)(E) + (B)\frac{(V-VP)}{DT} + (C)(CM) + (D)(E)[ABS(E)]$$

where:

Z = controller output
ZS = value at steady state
A = proportional constant
E = desired value — actual value
B = derivative constant
V = actual value
VP = predicted value
[ABS(E)] = absolute value of E
DT = differential time
C = integral constant
CM = represents the term ∫Edt, t = time
D = non-linear constant.

ZS represents the steady state term, AE the proportional part, $B(V-VP)/DT$ the derivative part, (C)(CM) the intergral part and (D)(E)(ABS E) the non-linear term.

The adaptive loop uses only the steady state and integral parts of the equation. Therefore, from Equations 1 and 2

(3)
$$AT31 = T31 - \left[ \Delta T31 \times \left( OF116 + CF116 \int_0^\tau (T100 - T32) dt \right) \right]$$

where:

OF116 = the previous value of F116 at steady state
CF116 = the integral constant for F116

Knowing the average temperature above the cooling coils, the lift air temperature required to maintain a desired reactor seal leg temperature (T100) is calculated in the following manner: The average temperature below the cooling coils (TB31) is calculated using Equation 4, a correlation determined by the instrumentation employed and type of unit being controlled.

(4)  $TB31 = (KCC)(DAT) - 99.5 + (0.8)(AT31)$ where:

KCC = constant, depending on the number of cooling coils in service
DAT = catalyst circulation through kiln, tons/hr.

From this correlation it can be noted that thermocouples below the cooling coils could be used in place of T31, although not preferred.

The effect of cooling air is determined using Equation 5, which was derived by heat balance and testing.

(5)  $T43 = [(C1)(TB31) + (0.61)(V22)(CP)(T34)] / [C1 + (0.6)(V22)(CP)]$ where:

T43 = temperature leaving cooling air zone, °F.
C1 = enthalpy of catalyst, B.t.u./° F./hr.

V22 = cooling air flow, lb./hr., as set by computer
CP = specific heat of air, B.t.u./lb.° F.
T34 = cooling air temperature, °F.

The required lift air temperature (T102) may now be calculated by heat balance — Equation 6.

(6)  $T102 = [(C1+C30+C7)(T100) - (C30)(T34) - (C1)(T43)] / [(C7)(F29)]$ where:

T34 = temperature of lift air before heater, °F.
C30 = enthalpy of secondary air, B.t.u./° F./hr.
C7 = enthalpy of primary air, B.t.u./° F./hr.
F29 = factor to correct for heat balance discrepancy in the lift.

This resulting lift air temperature is processed through a delay table so that its implementation will correspond to the transportation and instrumentation lags present in the system (feedforward control). If the predicted lift air temperature exceeds its minimum or maximum "trigger limits" the combustion air temperature is regulated to bring the lift air temperature back into range. Since the combustion air inlet is above the primary sensor, combustion air temperature must be regulated on a feedback basis. The combustion air loop raises or lowers the air temperature at specific time intervals (example — when the lift air temperature exceeds 800° F. the combustion air temperature is raised 20° F. every 20 minutes until the lift air drops below 800° F.) Also, if the predicted lift air drops below the minimum trigger limit, feedforward action is initiated on the cooling air flow to help bring the lift back into range. The specific constants for the control equations, delay tables and subroutines can be conveniently entered and changed using a simple input routine. The values for these constants are determined by on-line tuning of the unit being controlled, in a manner well known in the art.

FIGURES 7A and 7B present a simplified flow diagram of a control program suitable for use in this invention. After the start 200 of the program the first step is to define all inputs 201, these include control words, initial values, constants such as those used in the control Equation 2, maximum and minimum allowable changes and limits, specific heat equations and other values suitable to accomplish the detailed program which may be written in accordance with the general control scheme of this invention. Following this the set point station status and position are checked 202. This is accomplished by a simple "call" command to obtain the values of the input from the set point stations. If initialization is required this is accomplished by a routine 204 in which T31 is calculated by means of a heat balance; counters and delay tables are set and predicted temperatures are calculated for the lift air temperature and the cooling air flow rate. From 203 or 204 the program then continues to determine whether the adaptive loop is required 205. This determination is made on the basis of the passage of a fixed period of time and whether a difference exists between the actual reactor seal leg temperature and the desired seal leg set point. The adaptive loop 206 is carried out in accordance with Equation 3 to generate a new value for AT31. The value of AT31 is used to calculate 207 a required lift air temperature T102 in accordance with Equations 4–6. If T102 is not within preset limits 208 the combustion air temperature routine is activated from 209 to III (discussed in further detail below). If T102 is within limits the program continues to control point I210 at which point the combustion air loop (discussed in detail below) may be continued 211. If the lift air temperature set point SP42 is not within limits, the lift air heater is set to its operating limit 213. A determination is made whether cooling air is required 214. If cooling air is not required the program transfers to II215 to set the cooling air rate at a predetermined minimum (described in further detail below). If cooling air is required a predicted flow rate PR22 is calculated 216. A delay 217 is initiated in providing an output of the cooling air rate set point SP40. A determination is made as to whether the control limits are being approached 218. If the control limits for the system are being approached, an alarm message 219 is provided for the operator. After a delay period the set point station for the lift air heater is provided as an output signal 220. The variables and calculated values are written 221 for subsequent execution of the program which exits at 222.

II215 is the start of a subsidiary control loop which sets 223 the cooling air rate at a minimum value. After this a delay is instituted 224, the set point station value for the cooling air rate is provided as an output signal, and the main program is continued. It will be seen that in accordance with this program the cooling air rate is maintained at a minimum value unless the desired lift air temperature is outside its normal operating range.

III209 is the start of a subsidiary loop for the combustion air temperature, for which a required value is calculated 225. This required value is obtained by fixed incremental changes in the combustion air temperature when the lift air heater temperature is outside its normal operating range. Following the calculation of a new combustion air temperature it is determined whether enough time has passed since a previous change 226. If insufficient time has passed 211 the system is updated by a return to I210. If sufficient time has passed it is determined 227 whether the calculated combustion air temperature is within its operating limits. If it is not within predefined limits the set point station is adjusted to its operating limit 228. Otherwise the set point station is adjusted to a value to obtain the calculated combustion air temperature 229. Following this step, control is transferred to I210 through 211.

The above-described program may be readily implemented by conventional programming techniques well known in the art. For example, additional steps can be incorporated into the program to further check the limits of other variables, the status of operating units, filtering steps and additional alarm messages. The program may be written in a standard programming language such as Fortran. For example, the following could appear in the final program to implement 214 of FIGURE 7.

(7)    C IS COOLING AIR REQUIRED (8)    31IF(PT020−200.0)34,950,950

Statement 7 would be intended to provide information to the reader about the program; this is a comment rather than an instruction. Statement 8 is prefaced by the numeral 31 which is the number of the statement and would appear as the last instruction in each of 212 and 213 (i.e. the last instruction in each of 212 and 213 would be "GO TO 31"). Statement 8 provides that "IF" PT020 (the previously calculated required lift air temperature) minus 200.0 (a preset lower limit for the lift air heater at which additional cooling air is required, see FIGURE 3) is: negative, program control is transferred to instruction 34; zero or positive, program control is transferred to instruction 950. Instruction 34 would appear at the first statement in 216 and would be called for whenever the required lift air temperature is less than 200° F. Instruction 950 would be the first statement of 223 which would provide for a minimum cooling air flow rate whenever the required lift air temperature is 200° F. or higher.

The previous section on Equations for Control Strategy presents the technique which is employed as a basis for writing the above program. The remaining equations which may be called for to completely describe the operations being carried out may be derived by conventional techniques well known to those skilled in the art. For example, an equation to calculate 216 the required cooling air rate can be derived from a knowledge of: the enthalpy of the catalyst, primary air and secondary air; the specific heat of the air; the sensed cooling air input and output temperature; and the calculated temperature below the cooling coils. Suitable constants derived from observed operation of the unit are used in calculating the required cooling air rate. Such an equation is presented below.

(9) $PR22 = C1(TB31 - TDPL)/[CP \times (TDPL - T34) \times .61]$ where $TDPL = [(C1 + C7 + C30) \times T100 - 200(C7) - C30 \times T34]/C1$ The feedforward controller in the seal leg regulation program calculates the lift air temperature (T102) in accordance with Equation 6. In accordance with Equation 2 a controller output SP42 is obtained. To improve the servo response of the seal leg temperature to speed up transient response and reduce overshoot a feedback control scheme (FIGURE 2, reference 118) may be used. A feedback control equation may be calculated at the same frequency (i.e. 1/min.) as the feedforward controller. The value of the feedback correction may be algebraically added to the value of the feedforward control:

$$SP42^* = SP42 + SP118$$

where

SP42* is the corrected value for the lift air heater set point

SP42 is the set point value for the lift air heater calculated by the feedforward and adaptive loops SP118 is the set point correction computed by the direct feedback loop and SP118 is obtained from Equation 2 using the proportional, derivative and integral terms where A, B and C are refined on-line.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In a continuous thermofor catalytic cracking process for the conversion of a hydrocarbon feed wherein said hydrocarbon feed is contacted with catalysts in a reaction zone under conversion conditions, the conversion product and catalyst are continuously withdrawn from the reaction zone, the spent catalyst are continually passed from the reaction zone to a regeneration zone wherein carbonaceous deposits from the conversion reaction are removed from the catalysts, the regenerated catalysts are continuously withdrawn from the regeneration zone and passed to a lift pot from which they are transported to the reaction zone by a stream of lift air provided from lift air heater means, and wherein combustion air is passed into said regeneration zone from combustion air heater means; the improvement for controlling the temperature of said catalysts to a predetermined value entering the reaction zone which comprises:

(1) generating a first signal representative of the temperature in said regeneration zone, (2) computing in response to said first signal a required value for the temperature of said lift air stream which will bring said catalyst entering the reaction zone to said predetermined value, (3) generating a second signal representative of said required value and controlling said lift air heater means in response thereto, (4) continually repeating steps (1), (2), and (3), (5) periodically comparing the actual temperature of said catalysts entering the reaction zone to said predetermined value temperature and generating a correction factor dependent upon the difference between said actual and predetermined catalyst temperatures to adjust subsequent computations of the temperature of said lift air stream, and (6) actuating said combustion air heater means in response to said second signal when said required value is outside a preferred operating range of said lift air heater means.

2. In the process of claim 1 wherein said regeneration zone is cooled by air passed through the bottom portion of the regeneration zone, the improvement which comprises controlling the flow-rate of the cooling air in response to said second signal when said required value is outside a preferred operating range of said lift air heater.

3. In the process of claim 1 the improvement which comprises generating a second correction factor dependent upon the difference between said actual and predetermined catalyst temperatures, generating a third signal responsive to said second correction factor and controlling said heater means in response to said second and third signals.

4. In a system for the catalytic conversion of a hydrocarbon feed which includes a reactor, a kiln and a catalyst transportation zone between the exit of said kiln and the inlet of said reactor and wherein first conduit means provides an inlet to said kiln for combustion air, first heater means is provided to control the temperature of said combustion air, a second conduit means provides lift air to said transportation zone and a second heater means is provided to control the temperature of said lift air, the improvement which comprises first control means operatively connected to control the temperature of said first heater, second control means operatively connected to control the temperature of said second heater and a digital computer operatively connected to adjust said first and second control means.

5. The system of claim 4 wherein said first control means comprises a thermocouple in said first conduit between said first heater and said kiln, a valve means to control the flow of fuel to said first heater, an analog control means operatively connected between said thermocouple and said valve wherein said digital computer is operatively connected to receive the signal from said thermocouple and to generate a signal to said analog control means.

6. The system of claim 4 wherein said second control means comprises a thermocouple in said second conduit between said second heater and said transportation zone, a valve means to control the flow of fuel to said second heater, an analog control means operatively connected between said thermocouple and said valve wherein said digital computer is operatively connected to receive the signal from said thermocouple and to generate a signal to said analog control means.

7. The system of claim 4 which includes third conduit means to provide cooling air to said kiln and third control means operatively connected to said digital computer to adjust the flow rate of said cooling air.

8. The system of claim 4 which includes a thermocouple in said kiln which generates a first signal to said computer, and wherein said computer is programmed to predict the temperature of the catalyst from said kiln in response to said first signal and in response thereto to generate a required signal value for said second control means to maintain a predetermined value for the temperature of the catalyst entering said reactor.

9. The system of claim 8 which includes a thermocouple near the inlet of said reactor to sense catalyst temperature which generates a second signal to said computer, and wherein said computer is programmed to generate a correction factor signal responsive to said second signal and said required signal value is responsive to said correction factor signal.

References Cited

UNITED STATES PATENTS

| | | | |
|---|---|---|---|
| 3,175,968 | 3/1965 | Berger | 208—164 |
| 3,213,014 | 10/1965 | Atkinson et al. | 208—164 |
| 3,238,121 | 3/1966 | Parkin | 208—165 |
| 3,238,122 | 3/1966 | Hagerbaumer | 208—165 |
| 3,271,472 | 9/1966 | Ogle et al. | 260—683 |
| 3,316,170 | 4/1967 | Stewart et al. | 260—164 |

HERBERT LEVINE, Primary Examiner

U.S. Cl. X.R.

23—288; 208—159